(12) United States Patent
Ryu et al.

(10) Patent No.: US 7,713,645 B2
(45) Date of Patent: May 11, 2010

(54) CONDUCTIVE CONNECTING MEMBERS AND ELECTROCHEMICAL SYSTEMS

(75) Inventors: Takashi Ryu, Nagoya (JP); Naoya Takase, Kani (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/692,292

(22) Filed: Mar. 28, 2007

(65) Prior Publication Data

US 2007/0231593 A1 Oct. 4, 2007

(30) Foreign Application Priority Data

Mar. 29, 2006 (JP) .............................. 2006-091583

(51) Int. Cl.
*H01M 8/02* (2006.01)
(52) U.S. Cl. ....................................................... 429/34
(58) Field of Classification Search ................. 429/245, 429/234, 235, 34, 35, 38, 39, 30, 233, 237, 429/241; 428/596
See application file for complete search history.

(56) References Cited

U.S. PATENT DOCUMENTS 6,544,688 B1 * 4/2003 Cheng ........................ 429/245
6,979,517 B2 * 12/2005 Goda et al. .................. 429/243
2006/0141323 A1 6/2006 Ito et al.

FOREIGN PATENT DOCUMENTS

| DE | 196 49 456 A1 | 6/1998 |
|---|---|---|
| EP | 0 418 528 A1 | 3/1991 |
| FR | 1 433 469 A | 4/1966 |
| JP | 03-119662 A1 | 5/1991 |
| JP | 2001-035514 A1 | 2/2001 |
| JP | 03-119662 * | 6/2003 |
| JP | 2003-163016 A1 | 6/2003 |

* cited by examiner

*Primary Examiner*—Patrick Ryan
*Assistant Examiner*—Monique Wills
(74) *Attorney, Agent, or Firm*—Burr & Brown

(57) ABSTRACT

A conductive connecting member 1 is contacted with an electrochemical cell for electrical conduction. The cell has a solid electrolyte film, a first electrode provided on a first face of the solid electrolyte film and contacting a first gas and the first gas, and a second electrode provided on a second face of the solid electrolyte film and contacting a second gas. The conductive connecting member 1 has a plate-like main part 2 and a tongue piece 3 protruding from the main part 2. One end of the tongue piece 3 is connected with the main part 2.

10 Claims, 8 Drawing Sheets

CONDUCTIVE CONNECTING MEMBERS AND ELECTROCHEMICAL SYSTEMS

This application claims the benefit of Japanese Patent Application P 2006-91583 filed on Mar. 29, 2006, the entirety of which is incorporated by reference.

FIELD OF THE INVENTION

The present invention relates to a conductive connecting member and a electrochemical system.

BACKGROUND OF THE INVENTION

To produce a generator by stacking separators and solid oxide fuel cells alternately, it is necessary to supply a gas between a separator and the single cell so that fuel or oxidizing gas is supplied to the electrodes of the single cell. At the same time, the single cell and the separator must be electrically connected in series by inserting an electrically conductive connecting member between the separator and single cell. When such connecting member is located in, for example, a fuel gas passage, it must be chemically stable in a reductive fuel gas environment at an operating temperature of the single cell. Further, there must be a gap which the fuel gas is passed. For such reasons, so-called nickel felt has been commonly used as the connecting member in the fuel gas passage.

However, permeability is reduced due to the deformation and/or shrinkage of nickel felt under pressure, so that the efficiency of generation tends to be lowered. The applicant has therefore disclosed that a metal mesh is embossed to form protrusions and the mesh is used as a conductive connector in Japanese Patent publication No. 2003-163016A. According to such conductive connector, it is possible to assure the permeability and make a load onto an electrochemical cell uniform even when the electrochemical cell is pressurized to assure the conductance.

FIG. 8 is a plan view showing a conductive connecting member 31 made of a mesh, disclosed in Japanese Patent publication No. 2003-163016A. The mesh 31 is obtained by knitting many conductive wires 32 so that many loops (spacings) 33 and 33A are formed among the many wires 32. The mesh 31 has a shape of a flat plate before giving emboss shape. Emboss-shaped portions 31b are formed at predetermined positions of the mesh 31. 31a represents a non-emboss-shaped portion maintaining the shape before giving the emboss shape. 33A represents loops in the emboss-shaped portion 31b. The loop 33A is curved compared with the shape of the loop 33.

The emboss-shaped portion 31b is protruded over one face of the mesh 31 with respect to the central plane of the mesh before giving the emboss shape. A space is thus formed in the side of back face of the emboss-shaped portion 31b. The shape and depth of the space is decided depending on the shape and height of the emboss-shaped portion.

SUMMARY OF THE INVENTION

However, the present inventors have further conducted a research for stacking larger cells, and have found remaining problems as follows. That is, the amount of warping of the cell may be as large as 1 mm in the stacking of actual large-size cells. Such warping can be absorbed by the deformation of the emboss-shaped portion, so that good electrical connection can be maintained even if the flatness of the cell is deteriorated. However, the emboss-shaped portion has a large spring constant owing to its shape, so that there is a large difference of the stresses generated at positions where the emboss-shaped is flattened and not flattened. In the case that the warping of the electrochemical cell is increased, the emboss-shaped portion would give a large and uneven stress onto the electrochemical cell, so that the cell would be susceptible to destruction.

Further, the cell may be deformed in the operation of the stack. For example, the warping amount of the cell may be enlarged by several hundred μm by flowing hydrogen gas over a fuel electrode to perform the reduction of NiO. In this case, the mesh of the emboss-shape could not follow the change of the warping amount, so that the electrical contacts would be reduced to result in a reduction of generation performance.

An object of the present invention is to provide a conductive connecting member for electrical connection for electrochemical cells, so that the member can follow a relatively large warping and dislocation of the cell to assure the electrical connection and the overload of a stress onto the cell can be prevented when the member follows the warping and dislocation.

The present invention provides a conductive connecting member for contacting an electrochemical cell under a pressure and for electrical connection, said connecting member comprising a plate-like main part and a tongue piece protruding from the main part, wherein the tongue piece has one end connected to the main part.

The present invention provides an electrochemical system comprising the conductive connecting member and an electrochemical cell. The electrochemical cell has a solid electrolyte film, a first electrode provided on a first face of the solid electrolyte film and contacting a first gas, and a second electrode provided on a second face of the solid electrolyte film and contacting a second gas.

According to the present invention, the conductive connecting member has a tongue piece protruding from the plate like main part. The tongue piece is contacted with the electrochemical cell to assure the electrical connection. Unlike the emboss-shaped portion, the tongue piece can easily follow larger warping and dislocation. That is, when the size of the electrochemical cell is enlarged, the tongue piece can sufficiently follow a relatively large warping and dislocation of the cell. Moreover, the spring constant to the deformation can be made smaller, so that excessive stress onto the electrochemical cell can be avoided and the destruction of the cell can be prevented.

These and other objects, features and advantages of the invention will be appreciated upon reading the following description of the invention when taken in conjunction with the attached drawings, with the understanding that some modifications, variations and changes of the same could be made by the skilled person in the art.

DETAILED DESCRIPTION OF THE INVENTION

Figure 1:
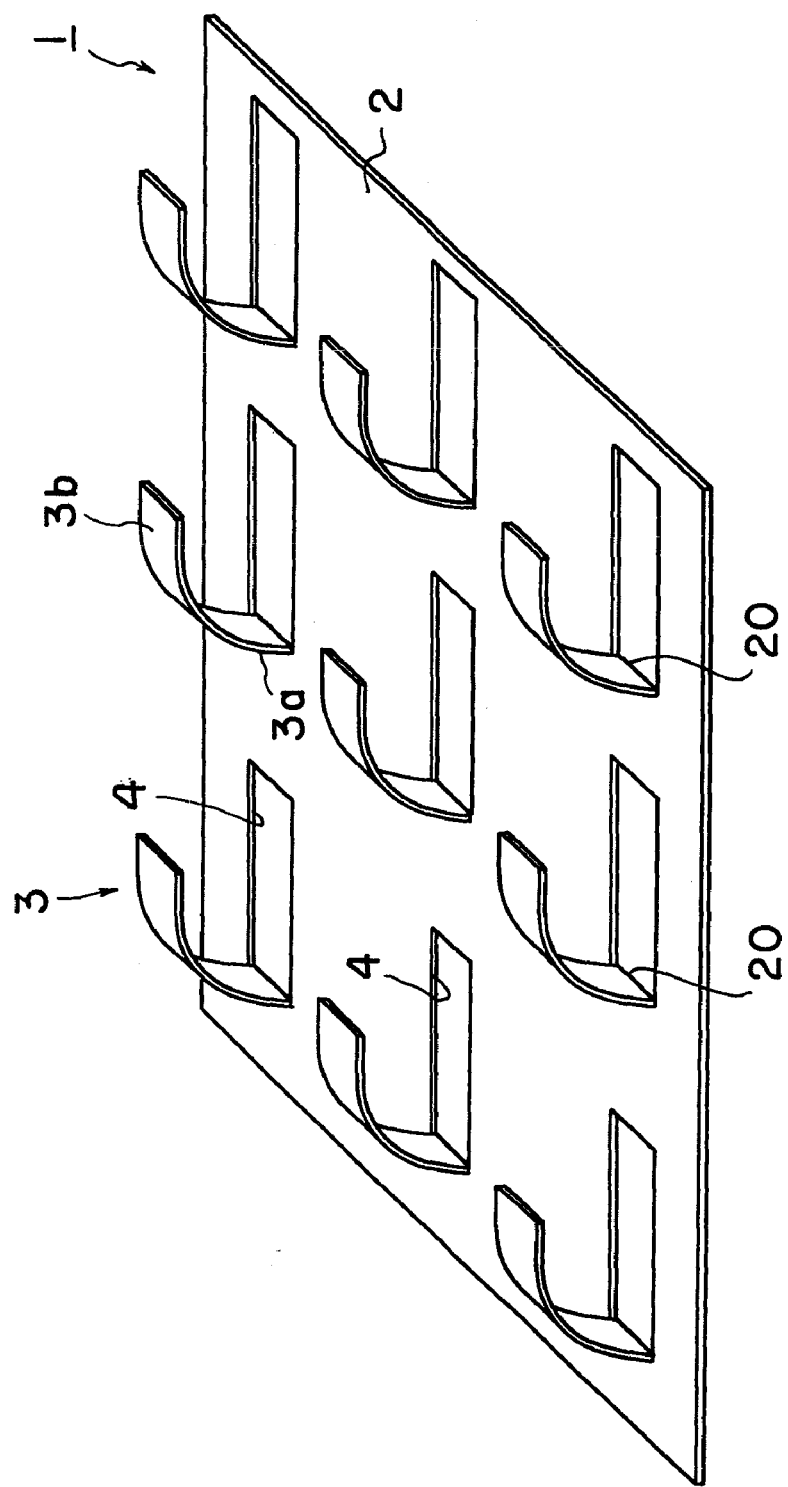
FIG. 1 is a perspective view showing a conductive connecting member 1 according to one embodiment of the present invention.

The tongue piece means a piece protruding from the main part, and preferably an elongate piece. Further, it is required that one end of the tongue piece is connected with the main part and the other end is separated from the main part.

The method of forming the tongue piece is not particularly limited. For example, the tongue piece may be fitted to the main part by welding or the like. According to a preferred embodiment, however, the tongue piece is formed by cutting the main part.

Such tongue piece may be formed as follows.

(1) The main part is processed by cutting except one side. The method of cutting is not particularly limited, and includes laser processing, press and mechanical cutting using a cutting tooth or the like.

(2) After the tongue piece is formed in the main part, a pressure is applied onto the tongue piece for protruding it from the main part. The method of applying the pressure is not particularly limited. For example, a pressing means having a predetermined shape, such as a shape of a pin, is provided at a corresponding position under the tongue piece and the pressing means is made contact with the tongue piece for applying a pressure on the piece. Each piece can be thus protruded from the main part.

(1) and (2) can be performed by press molding at the same time.

According to a preferred embodiment, the tongue piece has a rising part protruding from the main part and a flat part contacting an electrochemical cell. It is possible to increase a contact area of the tongue piece and cell to reduce the electrical resistance at the contact by providing such flat part, because the flat part can contact the cell over a larger contact area.

Further, according to a preferred embodiment, one side of the tongue piece is connected to the main part. That is, the elongate side of the tongue piece is connected with the main part. In this case, only a relatively small stress is required for arising the tongue piece and a spring constant of the deformation of the tongue piece can be lowered. It is thus possible to prevent the destruction of a cell even in the case the cell is considerably deformed.

According to a preferred embodiment, a plurality of bent parts is provided in the tongue piece. It is thus possible to further reduce the load due to the deformation of the cell and to reduce the stress applied on the cell. According to the present embodiment, preferably, adjacent bent parts are bent in the opposite directions.

According to a preferred embodiment, the main part is made of a permeable material. Although it is not particularly limited as far as it is permeable, it may preferably be a material capable of plastic deformation under pressure. Preferably, the permeable material is either of the followings.

(1) Mesh (any knitting method can be used such as plain weave, cross weave, Dutch weave, clamp weave, net weave or the like)

(2) A plate with vent holes formed. For example, a punching metal, an etching metal, an expanded metal (expand).

(3) porous metal sintered body

The present invention will be described further in detail referring to the drawings.

FIG. 1 is a perspective view showing a conductive connecting member 1 according to one embodiment of the present invention. The conductive connecting member 1 has a main part 2 of a shape of a flat plate. A plurality of tongue pieces is arranged at a specific interval upwardly in the drawing from the main part 2. Each tongue piece 3 has a rising part 3a protruding from the main part 2 and a flat part protruding from the rising part 3a in the horizontal direction. Each tongue piece 3 is connected to the main part 2 at one side 20 provided at the root of the piece.

According to the present example, the tongue piece 3 is formed by cutting the main part 2 to form a through hole 4 having the substantially same shape and dimensions as the tongue piece 3. The tongue piece 3b contacts the electrochemical cell at the upper side.

Figure 2:
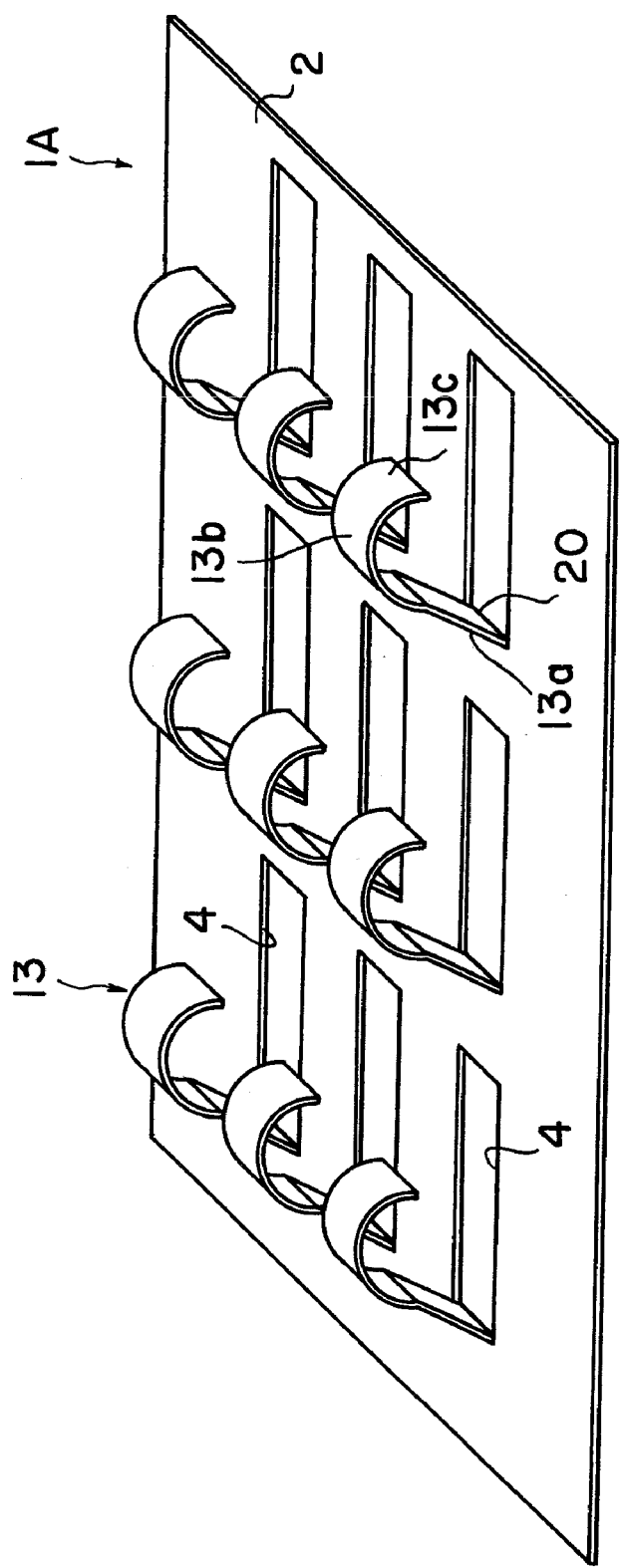
FIG. 2 is a perspective view showing a conductive connecting member 1A according to another embodiment of the present invention.

FIG. 2 is a perspective view showing a conductive connecting member 1A according to another embodiment of the present invention. The conductive connecting member 1A has a main part 2 of a shape of a flat plate. A plurality of tongue pieces 13 is arranged at a specific interval upwardly in the drawing from the main part 2. Each tongue piece 13 has a rising part 13a protruding from the main part 2, a flat part 13b protruding from the rising part 13a in the horizontal direction and a down part 13c extending from the flat part 13b toward the through hole 4. The flat part 13b contacts the electrochemical cell in the upper side. Each tongue piece 13 is connected to the main part 2 at one side 20 provided at the root of the piece.

Figure 3:
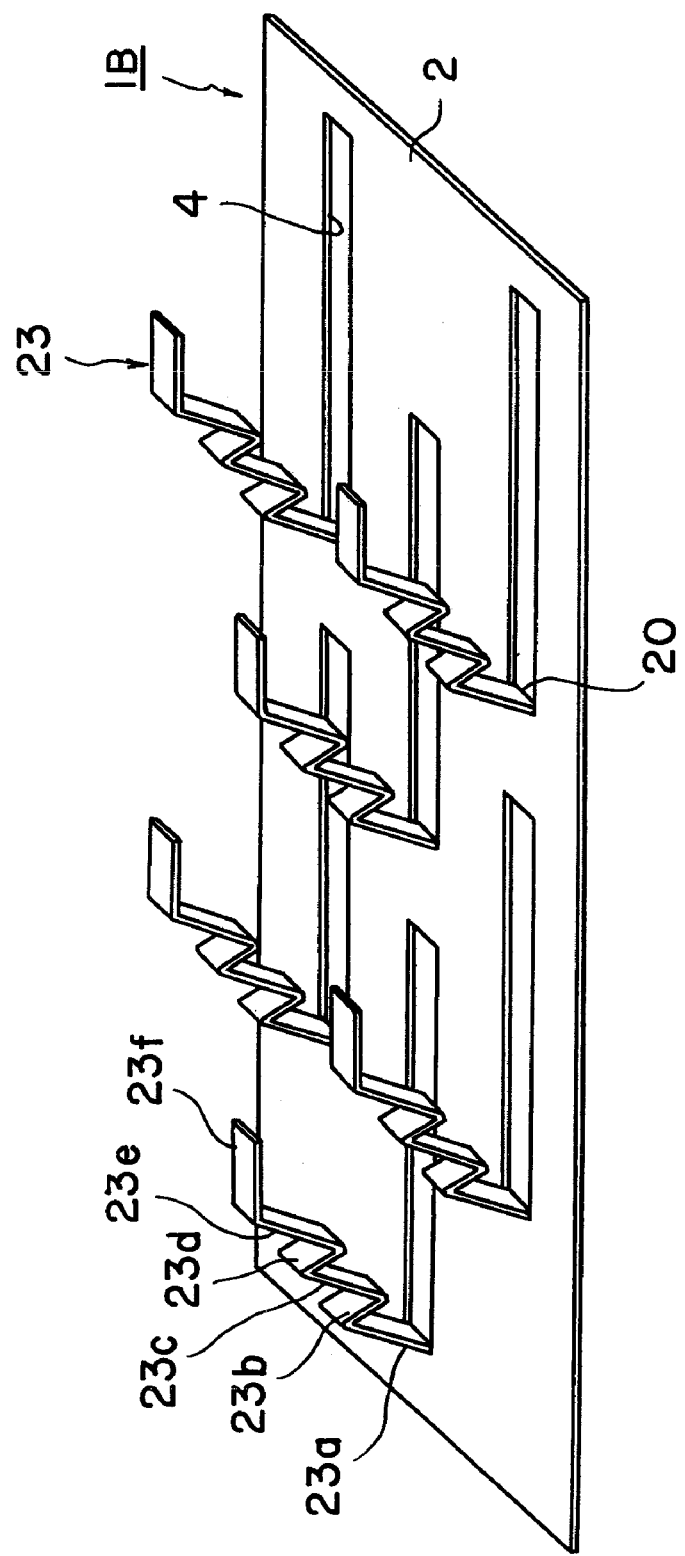
FIG. 3 is a perspective view showing a conductive connecting member 1B according to still another embodiment of the present invention.

FIG. 3 is a perspective view showing a conductive connecting member 1B according to still another embodiment of the present invention. The conductive connecting member 1B has a main part 2 of a shape of a flat plate. A plurality of tongue pieces 23 is arranged at a specific interval upwardly in the drawing from the main part 2. Each tongue piece 23 has a rising part 23a protruding from the main part 2, a plurality of bent parts 23b, 23c, 23d and 23e connected to the rising part and a flat part 23f. The flat part 23f contacts the electrochemical cell in the upper side. Each tongue piece 23 is connected to the main part 2 at one side 20 provided at the root of the piece.

Figure 4:
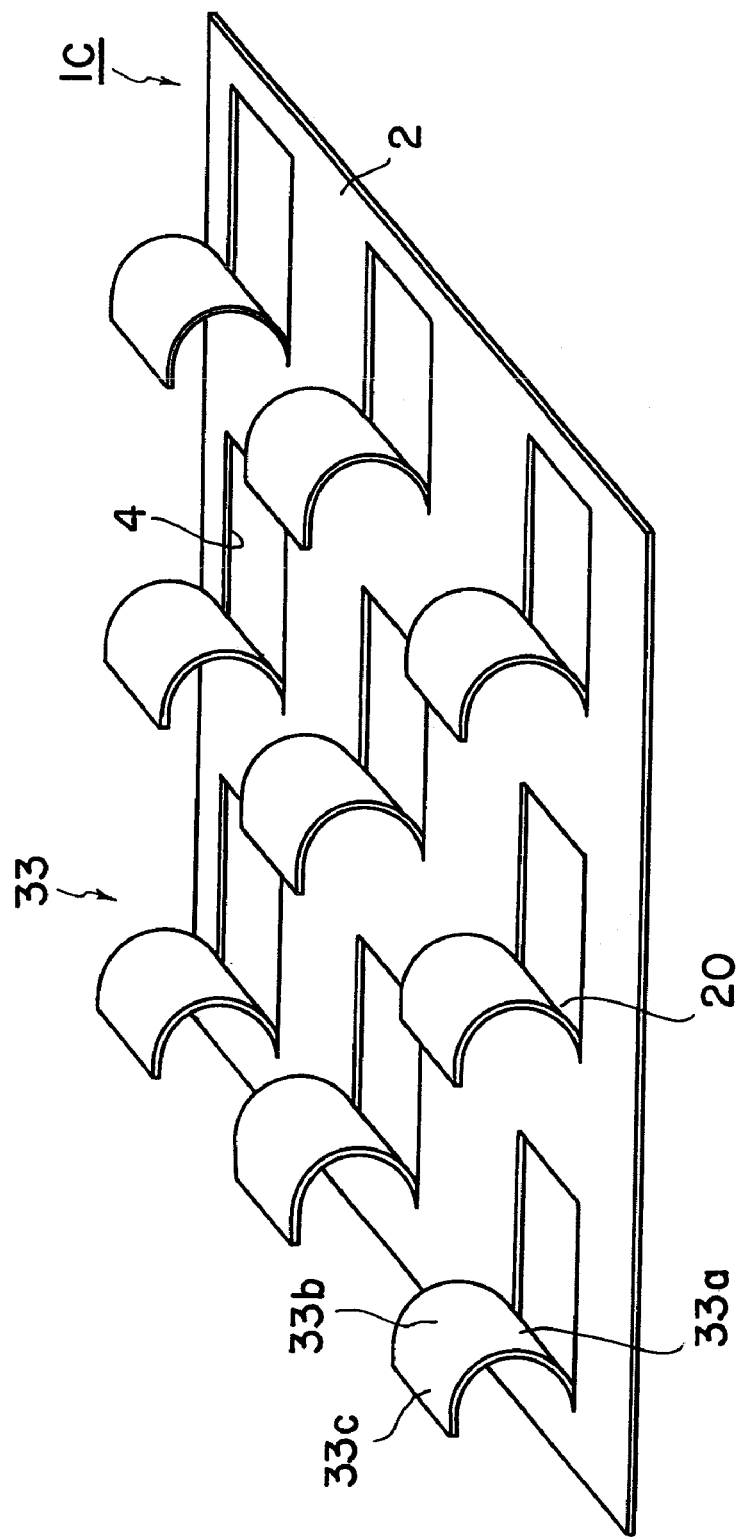
FIG. 4 is a perspective view showing a conductive connecting member 1C according to still another embodiment of the present invention.

FIG. 4 is a perspective view showing a conductive connecting member 1C according to still another embodiment of the present invention. The conductive connecting member 1C has a main part 2 of a shape of a flat plate. A plurality of tongue pieces 33 is arranged at a specific interval upwardly in the drawing from the main part 2. Each tongue piece 33 has a rising part 33a protruding from the main part 2, a curved part 33b continuously formed with the rising part, and a flat part 33c continuously formed with the curved part 33b. The flat part 33c contacts the electrochemical cell in the upper side. Each tongue piece 33 is connected to the main part 2 at one side 20 provided at the root of the piece.

Figure 5:
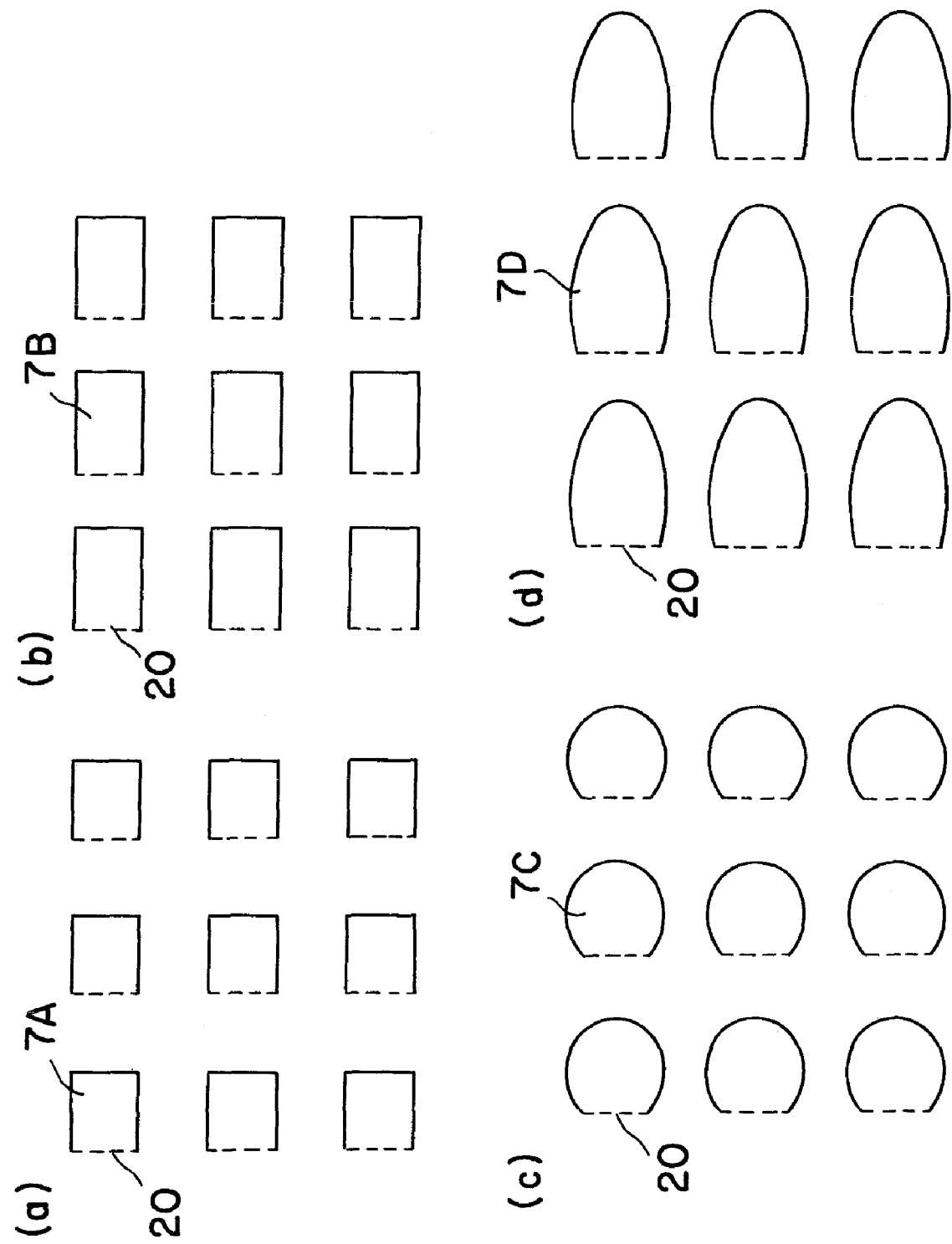
FIGS. 5 (a), (b), (c) and (d) are diagrams showing the planar shapes of conductive connecting members 7A, 7B, 7C and 7D, respectively.

The planar shape of the tongue piece is not particularly limited. For example, as shown in FIGS. 5 (a) and 5(b), the tongue pieces 7A and 7B may be rectangular. Further, as shown in FIG. 5 (c), the tongue piece 7C may have a shape of an arc. As shown in FIG. 5 (d), the tongue piece 7D may have a shape of a flat oval.

Figure 6:
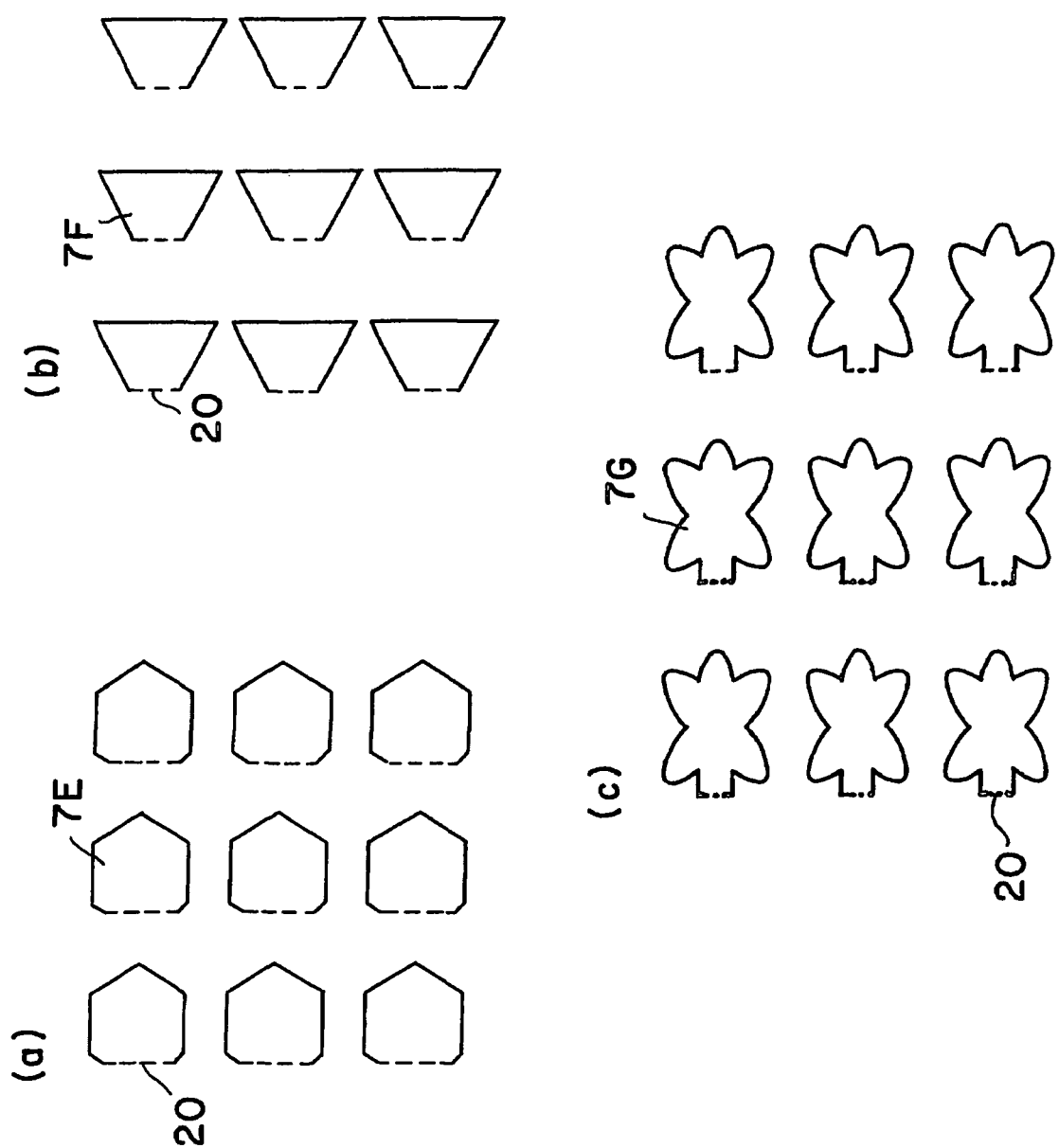
FIGS. 6 (a), (b) and (c) are diagrams showing the planar shapes of conductive connectors 7E, 7F and 7G.

Further, as shown in FIG. 6 (a), the tongue piece 7E may have a shape of a polygon. Further, as shown in FIG. 6 (b), the tongue piece 7F may have a shape of a trapezoid. Further, as shown in FIG. 6 (c), the tongue piece may have a shape of a star. The tongue piece may have the other various shapes.

The dimension of the tongue piece is not particularly limited. For obtaining a room for the permeability and deformation, the height of the tongue piece may preferably be 0.3 mm or larger and more preferably be 1.0 mm or larger. On the other hand, if the height of the tongue piece is too large, the efficiency of utilization of a gas would be lowered. The height of the tongue piece may thus preferably be 5.0 mm or smaller.

The material for the connecting member according to the present invention is required to be stable with respect to a gas to which this member is exposed, at an operating temperature of an electrochemical cell. Specifically, materials stable against an oxidizing gas include platinum, silver, gold, palladium, a nickel-based alloy such as Inconel, Nichrom and the like, a cobalt-based alloy such as Haynes alloy and the like, and an iron-based alloy such as stainless steel and the like. Materials which are stable against a reducing gas include nickel and nickel-based alloy in addition to the above described materials stable against an oxidizing gas.

An electrochemical cell means a cell performing an electrochemical reaction, in the invention. For example, an electrochemical cell includes an oxygen pump and a high temperature vapor electrolyte cell. The high temperature vapor electrolyte cell can be used as a hydrogen production device, and also as a removing system of water vapor. Further, the electrochemical cell can be used as a decomposition cell for $NO_X$ and/or $SO_X$. This decomposition cell can be used as a purification apparatus for discharge gas from motor vehicles, power generation systems or the like. In this case, oxygen in the discharge gas is removed through a solid electrolyte film while $NO_X$ is electrolyzed into nitrogen and oxygen, and the oxygen thus produced by this decomposition can be also removed. Further, by this process, vapor in the discharge gas is electrolyzed to produce hydrogen and oxygen, and the produced hydrogen reduces $NO_X$ to $N_2$. Further, in a preferable embodiment, the electrochemical cell is a solid oxide fuel cell.

Each of the first and second electrodes each may be a cathode or an anode. Further, each of the first and second gases may be a reducing gas or an oxidizing gas.

The material for a solid electrolyte layer is not particularly limited, and may be yttria-stabilized zirconia, yttria partially-stabilized zirconia. In the case of $NO_X$ decomposition cell, cerium oxide is also preferable.

The cathode material is preferably lanthanum-containing perovskite-type complex oxide, more preferably lanthanum manganite or lanthanum cobaltite, and most preferably lanthanum manganite. Into lanthanum cobaltite and lanthanum manganite, strontium, calcium, chromium, cobalt, iron, nickel, aluminum or the like may be doped. Further, the cathode material may be palladium, platinum, ruthenium, platinum-zirconia cermet, palladium-zirconia cermet, ruthenium-zirconia cermet, platinum-cerium oxide cermet, palladium-cerium oxide cermet, and ruthenium-cerium oxide cermet.

As the anode materials, nickel, palladium, platinum, nickel-zirconia cermet, platinum-zirconia cermet, palladium-zirconia cermet, nickel-cerium oxide cermet, platinum-cerium oxide cermet, palladium-cerium oxide cermet, ruthenium, ruthenium-zirconia cermet and the like are preferable.

The material for a separator is not limited as far as it is resistive against the first and second gases. The material may preferably be, for example, a complex oxide having perovskite structure containing lanthanum, such as lanthanum chromite. Further, in the case of a metallic separator, the material for the separator includes a nickel-based alloy such as Inconel, nichrom or the like, a cobalt-based alloy such as Haynes alloy, and an iron-based alloy such as stainless steel. It may be a material which is resistive against a reducing gas including nickel and a nickel-based alloy.

According to a preferred embodiment, an assembled generator is produced by a plurality of separators, electrochemical cells and conductive holding members, and a holding structure for holding the assembled cell while pressing it is provided. This pressing mechanism is not particularly limited. For example, this pressing mechanism may be a fastening member such as a bolt or the like, or a pressing mechanism such as a spring or the like.

EXAMPLES

A solid oxide fuel cell was produced having a substrate of a fuel cell as follows.

(Preparation of a Fuel Electrode Substrate)

50 parts by weight of nickel oxide powder having an average particle diameter of 1 μm and 50 parts by weight of 8 mol % yttria-stabilized zirconia powder (8YSZ: "TZ-8Y": supplied by Tosoh Corporation) were mixed and polyvinyl alcohol (PVA) was added as a binder to produce slurry. The slurry was dried and granulated with a spray drier to obtain powder for fuel electrode substrate. The granulated powder was molded by a one-directional press to obtain a disk having a diameter of 120 mm and a thickness of 1.5 mm. Thereafter, the disk was sintered for 3 hours at 1400° C. in air in an electric furnace to obtain a fuel electrode substrate 6a.

(Preparation of Solid Electrolyte Film)

Water and a binder were added to 8 mol % yttria-stabilized zirconia powder and mixed in a ball mill for 16 hours. The thus obtained slurry was applied on the fuel electrode substrate described above, dried and then co-sintered in an electric furnace in air at 1400° C. for 2 hours to produce a laminated sintered bodies of the fuel electrode substrate and a solid electrolyte having a thickness of 10 μm.

(Preparation of Air Electrode)

For preparing an air electrode, ethyl cellulose as a binder and terpineol as a solvent were added to powder of $La_{0.9}Ca_{0.1}MnO_3$ (LCM powder) having an average particle diameter of 1 μm to obtain paste. The paste was screen-printed, dried and fired at 1200° C. for 1 hour to produce a cell 6 of the fuel electrode 6a, solid electrolyte 6b and air electrode 6c (refer to FIG. 7).

(Measurement of Amount of Warping)

The amount of warping (flatness) of the thus produced cell was measured using a three-coordinate measuring machine. As a result of measurement, the cell after the firing of the air electrode was warped in a shape of a dome in which a convex was formed on the side of the air electrode 6c. The amount of warping was about 1.0 mm.

(Preparation of a Conductive Connecting Member According to the Present Invention)

As the conductive member 1 having permeability, an Ni mesh was used in the side of the fuel electrode and a Pt mesh was used in the side of the air electrode. Each of the meshes was cut by laser processing to provide cuttings 4 each having a shape of a tongue. Thereafter, the tongue piece was pressed to impart the protruded shape. The height of the tongue piece 3 with respect to the main part 2 was made 1.0 mm for absorbing the warping of the cell.

(Preparation of Conductive Connecting Member According to Comparative Example)

Figure 8:
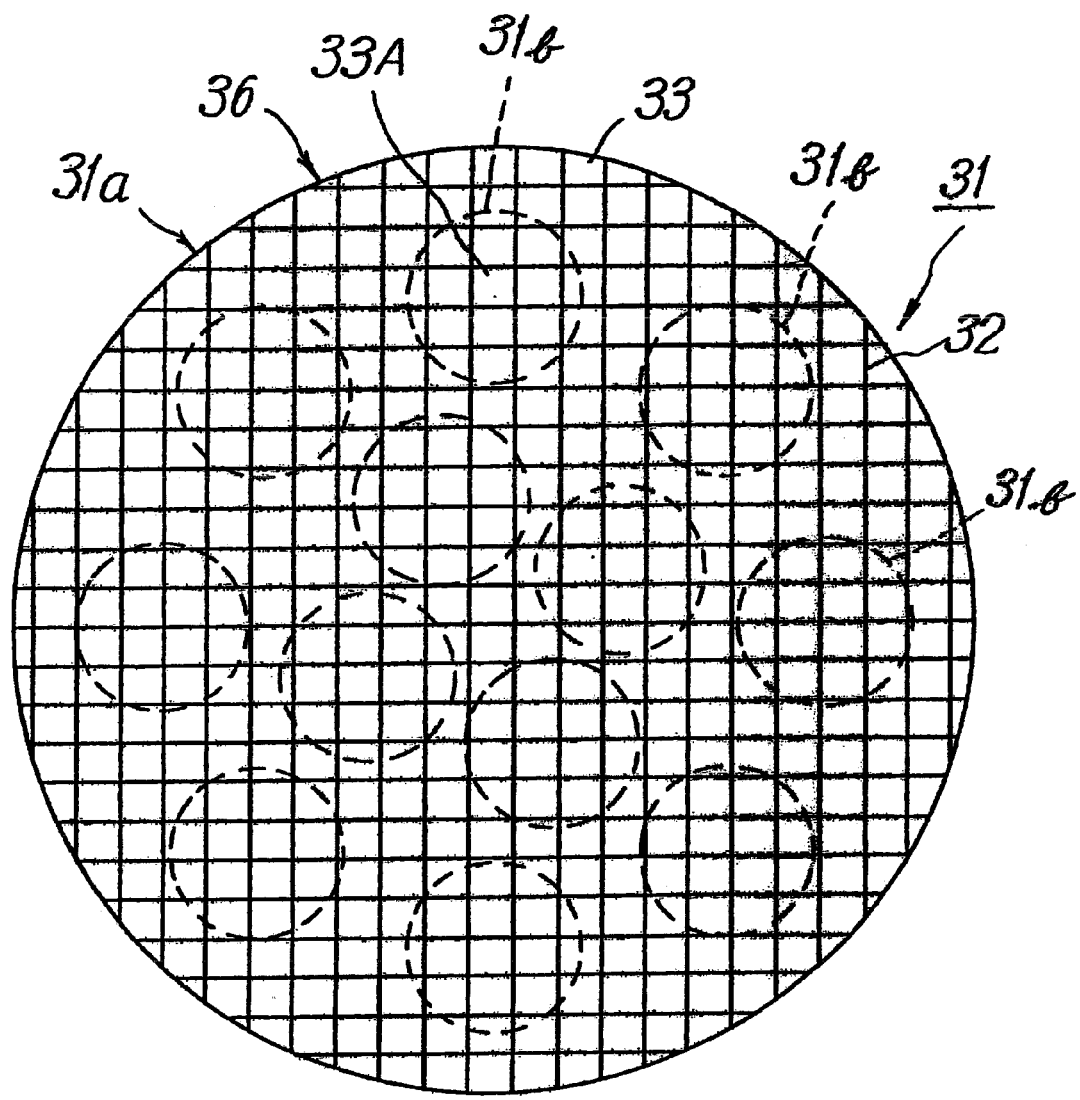
FIG. 8 is a plan view showing a conductive connecting member 31 having emboss-shaped portions, according to a comparative example.

The meshes 31 of Ni and Pt having the structure shown in FIG. 8 and the emboss-shape were produced. The height of the convex was made 1.0 mm for absorbing the warping of the cell.

(Evaluation of Performance)

Figure 7:
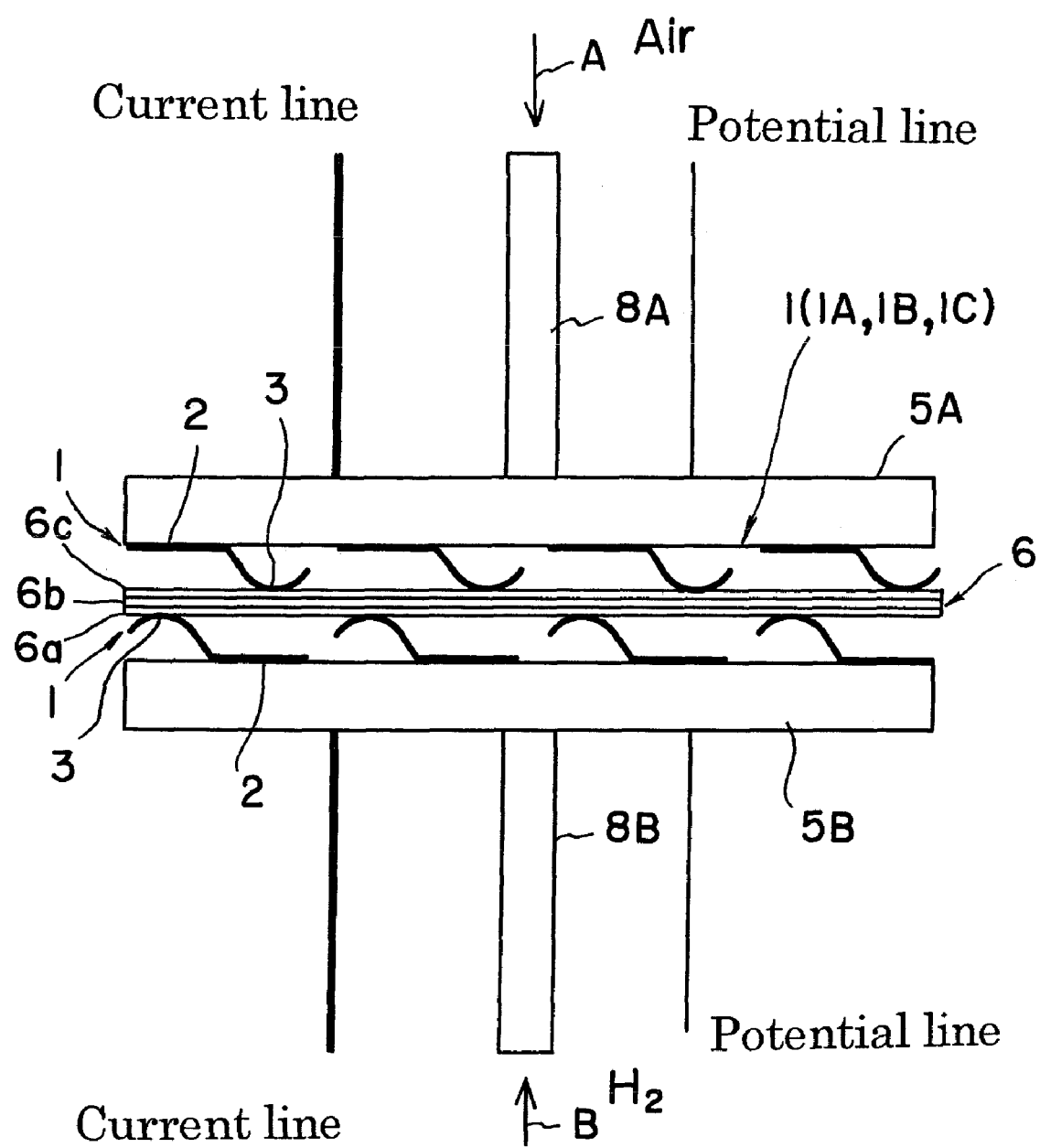
FIG. 7 is a diagram schematically showing a stack having an electrochemical cell, a conductive connecting member and a separator.

The thus obtained cell 6 and the conductive connecting member 1 were sandwiched between a metal interconnection 5A for air electrode and an interconnection 5B for fuel electrode as shown in FIG. 7 to prepare a stack. At this time, the conductive and permeable connecting members 1 of FIG. 2 were inserted between the interconnection for air electrode and the cell and between the interconnection for fuel electrode and the cell, respectively. Further, the tongue piece (convex) of each conductive connecting member was made contact each electrode face of the cell. Further, a load was applied onto the stack for pressing the conductive connecting member 1 so that the member 1 shrunk by the height of the protruding tongue piece and the contact of the cell and interconnection could be sufficiently assured.

The stack was set in an electric furnace for evaluating the performance. The temperature was elevated to 800° C. while nitrogen gas was flown in the side of the fuel electrode 6a and air was flown in the side of the air electrode 6c. When the temperature reached at 800° C., hydrogen gas was flown in the side of the fuel electrode 6a to perform reduction. After three hours of the reduction process, it was performed the evaluation of current-voltage characteristic and analysis of the internal resistance of the stack. Table 1 snows the results of evaluation of the performance according to the inventive and comparative examples.

TABLE 1

| | Maximum output Density (W/cm²) | Ohmic resistance (Ω · cm²) | Electrode reaction resistance (Ω · cm²) |
|---|---|---|---|
| Invention | 0.220 | 0.16 | 0.99 |
| Comparative Example | 0.156 | 0.30 | 1.30 |

According to the inventive example, the maximum output density was increased by 30 percent compared with that of the comparative example. Further, according to the results of the analysis of internal resistance, both of the ohmic resistance and reaction resistance of the electrode was lowered, according to the present invention.

After the evaluation of power generation, the stack was decomposed and the conductive connecting member was observed. According to the present invention, the cell electrodes (air and fuel electrodes) and the tongue pieces of the conductive connecting members were in good contact with each other. Contrary to this, according to the comparative example, peeling of the conductive connecting member and cell electrodes was observed in the outer peripheral portion of the cell in the side of air electrode and in the central portion of the cell in the side of fuel electrode. According to the results of measurement of the warping amount of the cell after the evaluation of generation, the warping amount was 1.0 mm before the generation and increased to 1.1 mm after the generation test. According to the comparative example, the conductive connecting member cannot follow the change of warping so that the peeling occurred. On the other hand, according to the present invention, a room for elongation to follow the deformation is provided in the tongue piece. It is thus proved that the tongue piece could easily follow the deformation of the cell induced in the power generation to prevent the peeling. As described above, the tongue piece could easily follow the deformation of the cell to prevent the peeling of the electrode and the conductive connecting member. It was thus proved that the contact area of the cell could be maintained and the performance could be improved.

Further, according to the comparative example, it was proved that cracks were easily induced in the cell during generation test and destruction occurred in the assembling. Table 2 shows the results of the generation test repeated five times.

TABLE 2

| Test | Invention | Comparative Example |
|---|---|---|
| First time | No cracks | No cracks |
| Second time | No cracks | Cracks observed |
| Third time | No cracks | Cracks observed |
| Fourth time | No cracks | Cracks observed |
| Fifth time | No cracks | Cracks observed |

According to the present invention, the destruction of the cell was not observed during the assembling and generation. Contrary to this, according to the comparative example, cracks were observed in 80 percent of the cells during the assembling and power generation so that the generation could not be performed. Besides, the results of generation shown in table 1 were those obtained in the samples where the cracks were not observed in the cells in both of the inventive and comparative examples.

As described above, according to the present invention, it is possible to sufficiently follow a relatively large warping of an electrochemical cell and to maintain the contact of the cell and interconnection without applying an excessive stress on the cell and causing the destruction of the cell.

The present invention has been explained referring to the preferred embodiments, however, the present invention is not limited to the illustrated embodiments which are given by way of examples only, and may be carried out in various modes without departing from the scope of the invention.

The invention claimed is:

1. A conductive connecting member for contacting an electrochemical cell under a pressure and for electrical conduction, the member comprising a plate-like main part and a tongue piece protruding from said main part, said tongue piece comprising a rising part protruding from said main part and a flat part contacting the electrochemical cell, wherein a first end of said tongue piece is connected with said main part and a second end of said tongue piece moves freely in relation to said main part, wherein the second end of said tongue piece is separated from said main part forming a space between the second end of said tongue piece and said main part, and said flat part is substantially parallel to said main part.

2. The conductive connecting member of claim 1, wherein said tongue piece is formed by cuffing said main part.

3. The conductive connecting member of claim 1, wherein one side of said tongue piece is connected with said main part.

4. The conductive connecting member of claim 1, wherein said tongue piece comprises a plurality of bent parts.

5. The conductive connecting member of claim 1, wherein said main part and said tongue piece comprise a permeable material.

6. The conductive connecting member of claim 5, wherein said permeable material comprises a mesh.

7. The conductive connecting member of claim 5, wherein said permeable material comprises a plate-like body comprising bent holes formed therein.

8. The conductive connecting member of claim 5, wherein said permeable material comprises an expanded metal.

9. An electrochemical system comprising said conductive connecting member of claim 1 and an electrochemical cell, wherein said electrochemical cell comprises a solid electrolyte film, a first electrode provided on a first face of said solid electrolyte film and contacting a first gas and a second electrode provided on a second face of said solid electrolyte film and contacting a second gas.

10. The conductive connecting member of claim 1, wherein said first and second ends are distal ends of said tongue piece, said rising part is provided at said first end, and said flat part is provided at said second end.

* * * * *

UNITED STATES PATENT AND TRADEMARK OFFICE
CERTIFICATE OF CORRECTION

| | |
|---|---|
| PATENT NO. | : 7,713,645 B2 |
| APPLICATION NO. | : 11/692292 |
| DATED | : May 11, 2010 |
| INVENTOR(S) | : Takashi Ryu et al. |

Page 1 of 1

It is certified that error appears in the above-identified patent and that said Letters Patent is hereby corrected as shown below:

Column 8

*Line 60*: please change "cuffing" to --cutting--

Signed and Sealed this

Third Day of August, 2010

David J. Kappos
*Director of the United States Patent and Trademark Office*